May 17, 1938.  H. STEMMAN  2,117,461
EARTHWORKING TOOL
Filed May 22, 1937  2 Sheets-Sheet 1
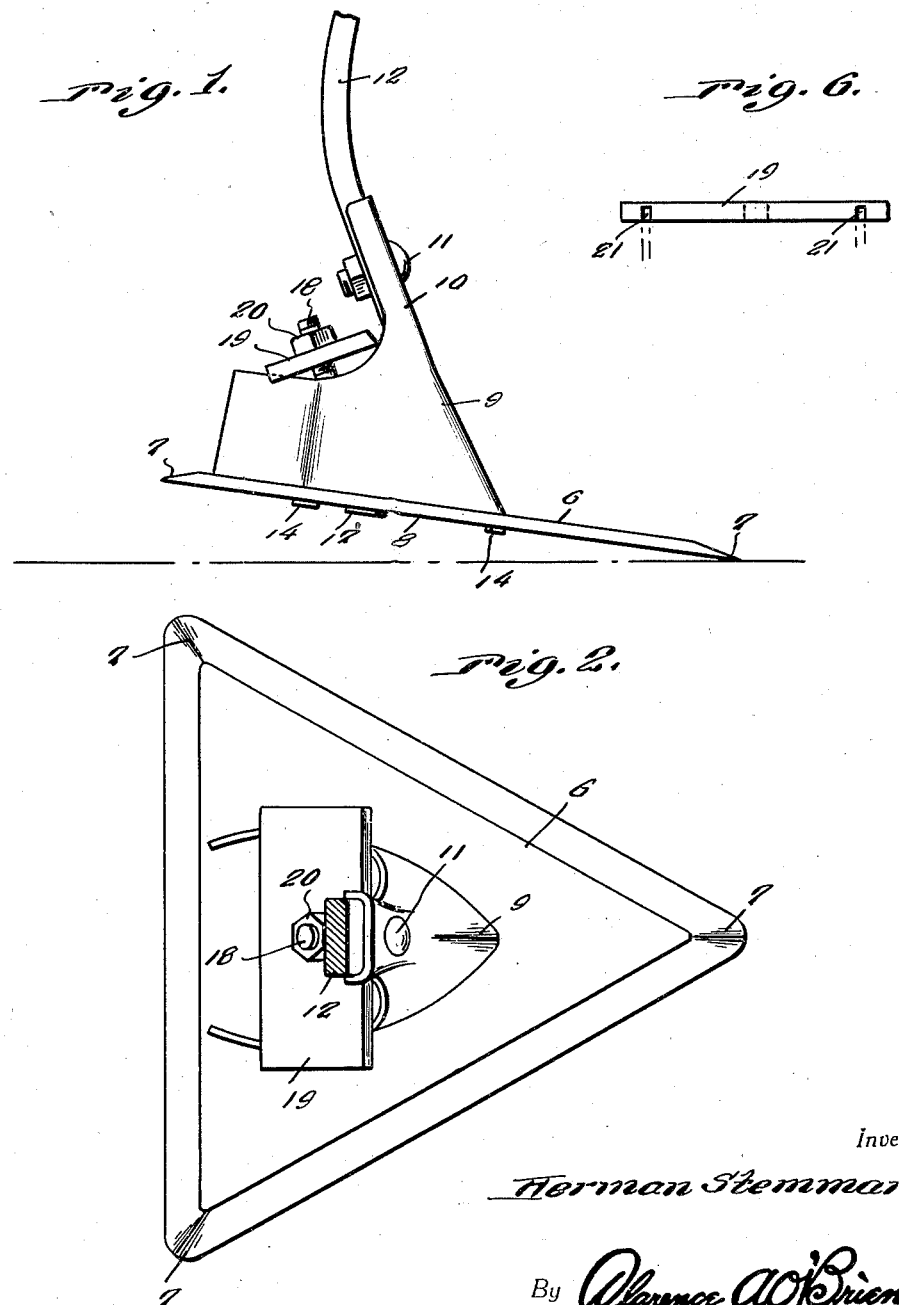
Inventor
Herman Stemman
By Clarence A. O'Brien
Hyman Berman
Attorneys

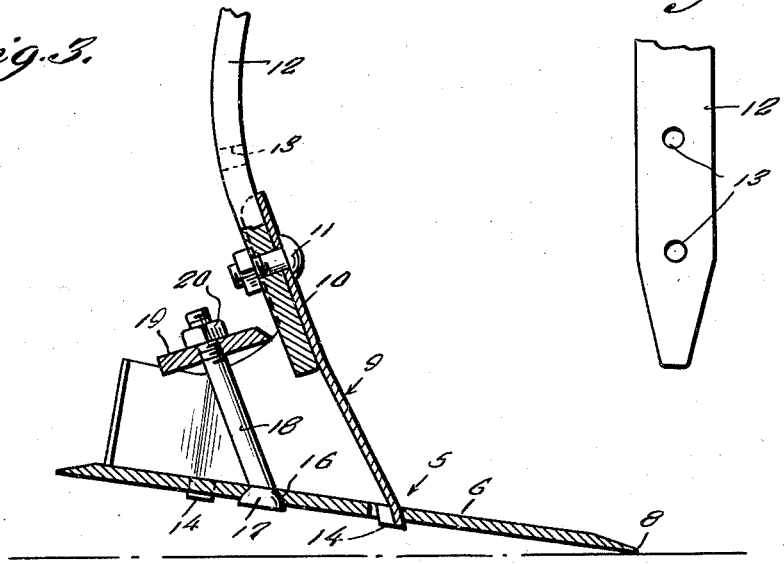
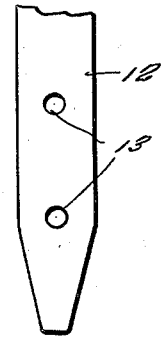
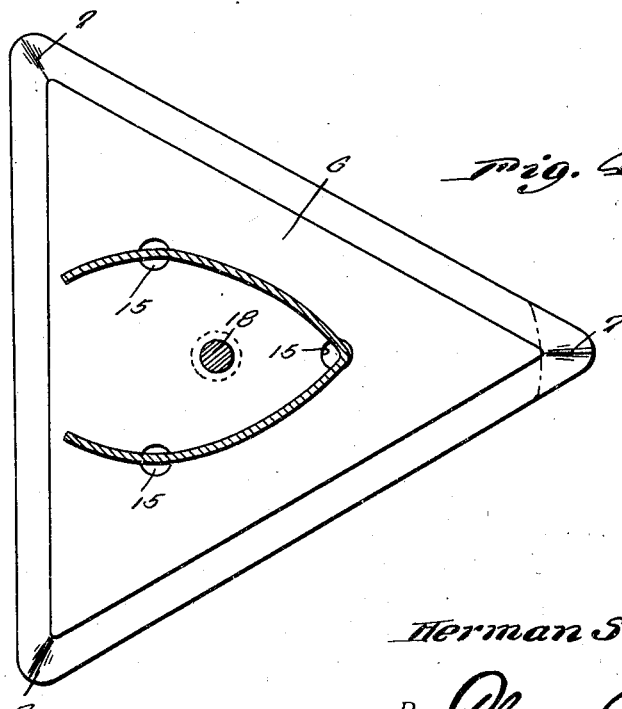

Patented May 17, 1938

2,117,461

UNITED STATES PATENT OFFICE 2,117,461

EARTHWORKING TOOL

Herman Stemman, Stevensville, Mont.

Application May 22, 1937, Serial No. 144,250

3 Claims. (Cl. 97—203)

This invention is an earth working tool adapted to be mounted on the shank of a farm implement, such as a beet cultivator, corn cultivator, or the like, and the object of the invention is to provide a tool of this character which is substantially self sharpening; has three working points, either one of which may be brought into use, and is so constructed that when the cutting edges of the tool become dull on one side the tool may be readily inverted, and when inverted will present cutting edges of suitable sharpness.

A further object of the invention is to provide an earth working tool in the form of a triangular shaped blade one face of which at the edges thereof is bevelled to present sharpened cutting edges, the idea being that as the underface of the blade wears due to use the under surface of the blade at the edges thereof will bevel off so that upon the inverting of the blade sufficiently sharp edges will be presented, thus obviating constant sharpening of the blade edges through the medium of a tool or the like.

The invention, together with its objects and advantages will be best understood from a study of the following description taken in connection with the accompanying drawings, wherein:

Figure 1 is a side elevational view of the invention.

Figure 2 is a top plan view thereof with the tool shank shown in cross section.

Figure 3 is a vertical sectional view through the tool.

Figure 4 is a view showing the blade in top plan and the attaching foot in transverse section.

Figure 5 is an elevational view of one end of the tool shank; and

Figure 6 is an edge elevational view of a plate hereinafter more fully referred to.

Referring to the drawings by reference numerals, it will be seen that my improved earth working tool indicated by the reference numeral 5 comprises a blade 6 that is substantially triangular to provide three working points 7 either one of which may be brought into position for working the ground or earth. Also, each of the three edges of the blade 6 is sharpened to a cutting edge 8.

Further, the tool 5 includes an attaching foot 9 which is formed from a sheet of metal or other suitable material, such shapes and dimensions to correspond somewhat to the well-known "duck-foot" element usually employed for securing an earth working blade to a tool shank of a beet cultivator or the like. The attaching member or "duck-foot" 9 at the front thereof is extended upwardly as at 10 and has the extended portion 10 bolted or otherwise secured as at 11 to the lower end of the conventional tool shank 12. In this connection, it will be noted that the end of the shank 12 is provided with a pair of openings 13 with a selected one of which the bolt 11 is engaged for securing the duck-foot 9 to the shank 12 at the desired position of adjustment.

At the base thereof, the duck foot 9 is provided at its forward end and at each of its two sides with lugs 14 engageable in openings 15 provided in the body of the blades 6 and in a manner to secure the blade 6 against rotative movement relative to the duck-foot 9.

Also the blade 6 is provided with a suitably located opening 16 that receives the head 17 of a bolt 18 which extends upwardly through the opening in the plate 6 and within the confines of the body portion of the duck-foot 9.

The shank of the bolt 18 is offset at an angle to the head 17 thereof as shown in Figure 3 and the threaded upper end of the bolt extends through a suitable opening provided therefor in a clamping plate 19 that rests at an angle to the horizontal on the upper edges of the sides of the duck-foot 9 as shown. A nut 20 is threaded on the upper end of the bolt to bear against the plate 19 to secure the latter in position and also to secure the blade 6 engaged with a duck-foot 9.

To prevent lateral movement of the plate 19 relative to the duck-foot, this plate on the under side thereof is provided with suitable notches or grooves 21 which receive the upper edges of the sides of the duck-foot 9.

It will thus be seen that to bring a selected point 7 into dirt working position, nut 20 is loosened sufficiently to permit the blade 16 to drop downwardly out of engagement with the lugs 14 of the duck-foot, whereupon the blade 6 is then rotated to bring the selected point 7 into position, after which the blade 6 is raised upwardly to engage the lugs 14 and the nut 20 is threaded home on the bolt to secure the parts in assembled condition and fixed relative to one another.

Further, it will be appreciated that as the blade is used the under surface of the blade at the edges thereof will wear at an angle, so that after all of the points on one side of the blade have become dull, the blade may be reversed or turned up side down, and in this inverted position will present edges and points of sufficient sharpness as to permit further use of the blade without requiring mechanical sharpening of the blade. This inverting of the blade may be repeated from time to time until the blade has worn too short, at which time it may be discarded and a new blade substituted therefor.

It will be understood that in actual practice the earth working blade 6 may be used for breaking the ground, also as a weeding tool, or otherwise as found desirable.

It is thought that a clear understanding of the invention, its utility and advantages will be had without a more detailed description.

Having thus described the invention, what is claimed as new is:

1. In an earth working tool of the character described, in combination with a tool supporting shank, a duck foot adapted to be secured to the end of the shank, said duck foot at its lower edge being provided at the forward end thereof, and at each of two sides thereof, with depending lugs, and a substantially triangular earth working blade provided with openings corresponding in number to the lugs on said duck foot and positioned relative to one another corresponding to the relative position of the lugs for engaging said lugs to secure the blade on the duck foot against rotative movement relative thereto, said blade being also provided inwardly from the edges thereof with an opening, an apertured clamping plate disposed between and resting on the upper edges of the sides of said duck foot, and a bolt extending upwardly through the last mentioned opening in said blade and the opening in said clamping plate and cooperating with the clamping plate for securing the blade positively to said duck foot.

2. In an earth working tool of the character described, in combination with a tool supporting shank, a duck foot adapted to be secured to the end of the shank, said duck foot at its lower edge being provided at the forward end thereof, and at each of two sides thereof, with depending lugs, and a substantially triangular earth working blade provided with openings corresponding in number to the lugs on said duck foot and positioned relative to one another corresponding to the relative position of the lugs for engaging said lugs to secure the blade on the duck foot against rotative movement thereto, said blade being also provided inwardly from the edges thereof with an opening, an apertured clamping plate disposed between and resting on the upper edges of the sides of said duck foot, and a bolt extending upwardly through the last mentioned opening in said blade and the opening in said clamping plate and cooperating with the clamping plate for securing the blade positively to said duck foot, and said clamping plate being provided on the underside thereof with grooves receiving the edges of the sides of said duck foot.

3. In an earth working tool of the character described, the combination with a tool supporting shank, a duck foot adapted to be secured to the end of the shank, said duck foot at its lower edge being provided at the forward end thereof, and at each of two sides thereof, with depending lugs, and a substantially triangular earth working blade provided with openings corresponding in number to the lugs on said duck foot and positioned relative to one another corresponding to the relative position of the lugs for engaging said lugs to secure the blade on the duck foot against rotative movement relative thereto, said blade being also provided inwardly from the edges thereof with an opening, an apertured clamping plate disposed between and resting on the upper edges of the sides of said duck foot, and a bolt extending upwardly through the last mentioned opening in said blade and the opening in said clamping plate and cooperating with the clamping plate for securing the blade positively to said duck foot, said clamping plate being provided on the under side thereof with grooves receiving the edges of the sides of said duck foot, and the lower edges of the duck foot being on a bias whereby to support said blade at an angle to the horizontal.

HERMAN STEMMAN.